United States Patent
Chmara et al.

(10) Patent No.: US 6,684,270 B1
(45) Date of Patent: Jan. 27, 2004

(54) ACCELERATED FILE SYSTEM THAT RECOGNIZES AND REROUTES UNCONTESTED READ OPERATIONS TO A SECOND FASTER PATH FOR USE IN HIGH-CAPACITY DATA TRANSFER SYSTEMS

(75) Inventors: Thomas P. Chmara, Richmond (CA); R. Bruce Wallace, Ashton (CA)

(73) Assignee: Nortel Networks Limited (CA)

( * ) Notice: Subject to any disclaimer, the term of this patent is extended or adjusted under 35 U.S.C. 154(b) by 700 days.

(21) Appl. No.: 09/624,269

(22) Filed: Jul. 24, 2000

Related U.S. Application Data

(60) Provisional application No. 60/208,472, filed on Jun. 2, 2000.

(51) Int. Cl.[7] .................................................. G06F 3/00
(52) U.S. Cl. ........................... 710/38; 710/16; 710/20; 710/22; 710/28; 710/31; 710/36; 710/316; 711/100; 709/319
(58) Field of Search .............................. 709/319; 710/16, 710/20, 22, 28, 31, 36, 38, 316; 711/100

(56) References Cited

U.S. PATENT DOCUMENTS

| | | | | |
|---|---|---|---|---|
| 5,379,379 A | * | 1/1995 | Becker et al. ................. 711/3 |
| 5,561,825 A | * | 10/1996 | Yamagami et al. ........... 710/58 |
| 5,802,547 A | * | 9/1998 | Legvold ..................... 711/100 |
| 5,802,580 A | * | 9/1998 | McAlpine .................... 711/149 |
| 5,931,918 A | * | 8/1999 | Row et al. ................... 709/321 |
| 6,389,427 B1 | * | 5/2002 | Faulkner .................... 707/104.1 |
| 6,549,959 B1 | * | 4/2003 | Yates et al. .................... 710/22 |

FOREIGN PATENT DOCUMENTS

| EP | 0166341 | * | 1/1986 |
|---|---|---|---|

* cited by examiner

Primary Examiner—Nabil El-Hady
(74) Attorney, Agent, or Firm—Steubing McGuinness & Manaras LLP

(57) ABSTRACT

An accelerated filesystem includes a fast-path and a slow-path. The fast-path includes an enhanced storage controller and an enhanced network processing function. Uncontested READ and WRITE operations are processed on the fast-path. A READ session is initialized by obtaining file-storage metadata that is tagged with a session ID. The session ID is provided to the enhanced network processing function, and to the application as a file handle, and the tagged metadata is provided to the enhanced storage controller. Subsequent access is facilitated by communicating the file handle from the application to the enhanced network processing function, which passes the file handle to the enhanced storage controller in response. The enhanced storage controller executes a file handle to block list translation by employing the tagged metadata to retrieve the appropriate data. The retrieved data is transmitted to the application via the enhanced network processing function. For WRITE operations, a list of free blocks is preallocated and tagged with an identifier that is employed by the fast-path.

38 Claims, 4 Drawing Sheets

ACCELERATED FILE SYSTEM THAT RECOGNIZES AND REROUTES UNCONTESTED READ OPERATIONS TO A SECOND FASTER PATH FOR USE IN HIGH-CAPACITY DATA TRANSFER SYSTEMS

CROSS-REFERENCE TO RELATED APPLICATIONS

A claim of priority is made to U.S. Provisional Patent Application Ser. No. 60/208,472, entitled Data Access in a Network Environment, filed on Jun. 2, 2000.

FIELD OF THE INVENTION

The present invention is generally related to network communications, and more particularly to data access via a computer filesystem.

BACKGROUND OF THE INVENTION

A computer filesystem functions as an interface between applications and data. For example, when an application attempts to access stored data the filesystem translates the representation of data provided by the application to positions on physical storage media. Such translation is facilitated through use of metadata that is maintained by the filesystem. The metadata describes the organization and structuring of files, file attributes, permissions; and the file layout in terms of block address chains.

One shortcoming associated with filesystems is relatively slow operation. For example, filesystems are not particularly well suited for processing voice and video data that is streamed over a network in real time; nor for volume data transfers which involve large quantities of information being moved from a single source to a single destination for backup, replication, or other purposes. Consequently, filesystems may present a bottleneck to delivery of real time audio and video via computer networks such as the Internet.

SUMMARY OF THE INVENTION

In accordance with the present invention, an accelerated filesystem includes a fast-path and a slow-path. The fast-path includes a data storage control circuit and a circuit for diverting selected requests for data transfer to the data storage control circuit. The data storage control circuit employs metadata to perform file handle to block list translation, and prompts retrieval of data from data storage.

In one embodiment of the invention, uncontested READ operations are processed on the fast-path and other operations are processed on the slow-path. A READ operation is generally initiated by a request from an application to open a file for reading. In response to the request an enhanced network processing passes the request to an exception processing function that is associated with the slow-path. The file is then reviewed to ensure that existence, privileges, locking, and other designated criteria are met. If the criteria are met, corresponding file-storage metadata is obtained and tagged with a session ID that is unique to the node for a period much longer than the file remains open to the requestor. The session ID is provided to the application as a file handle. The tagged metadata for that file's layout is provided to an enhanced storage controller that is associated with the fast-path. The session ID is also recorded at the enhanced network processing function to allow its recognition of subsequent requests in this session. Subsequent accesses associated with this READ session is facilitated by communicating the file handle from the application to the enhanced network processing function, which recognizes the file handle or "session ID" as signifying "fast-path" treatment and so passes the file handle to the enhanced storage controller. The enhanced storage controller executes a file handle to block list translation by employing the tagged metadata to retrieve the appropriate data. The retrieved data is delivered directly to the enhanced network processing function, and is then transmitted to the application.

The accelerated filesystem facilitates delivery of real-time voice and video data. Data access operations might be said to include OPEN, READ, WRITE, select/poll, ioctl/devctl, and CLOSE. Voice and video streaming generally employ uncontested READ operations. An uncontested READ operation indicates a situation where no file writer exists during the READ session. It has been recognized that uncontested READ operations are generally less complex to execute than other operations and can be partially automated. In particular, access to file metadata is sufficient to enable identification of the next block or blocks of data to be retrieved. Early recognition and rerouting of such uncontested READs reduces latency by avoiding use of the main node CPU. In particular, the enhanced-network processing function employs dedicated hardware or network-processor engines to recognize and reroute uncontested READs directly to the enhanced storage controller. The block list, or partial block list, for the file is maintained by the enhanced storage controller function. Data retrieval from storage can be delivered directly to the enhanced network processing function. Consequently, generation of copies in main memory may be avoided, memory consumption and copy latency may be reduced, and delivery of real-time voice and video data may be accelerated.

WRITE operations may also be placed on the fast-path when storage-device activity can be constrained to a single writer and no readers, from the perspective of the storage device. To allow unsupervised fast-path writes, storage blocks are preallocated. The list of preallocated blocks is tagged and the tagged list provided to the storage controller. The FileID is also provided to the application and the enhanced network processing function. When a file handle corresponding to the FileID is recognized by the enhanced network processing function during subsequent WRITE operations associated with the session, the FileID and data are provided to the storage controller. The FileID is employed to identify the list of preallocated blocks into which the data is placed. Block preallocation has an advantage for streaming traffic since the blocks can be allocated to optimize retrieval performance, thus improving transfer performance.

BRIEF DESCRIPTION OF THE DRAWINGS

The invention will be more fully understood from the following Detailed Description and Drawing, of which.

DETAILED DESCRIPTION

Figure 1:
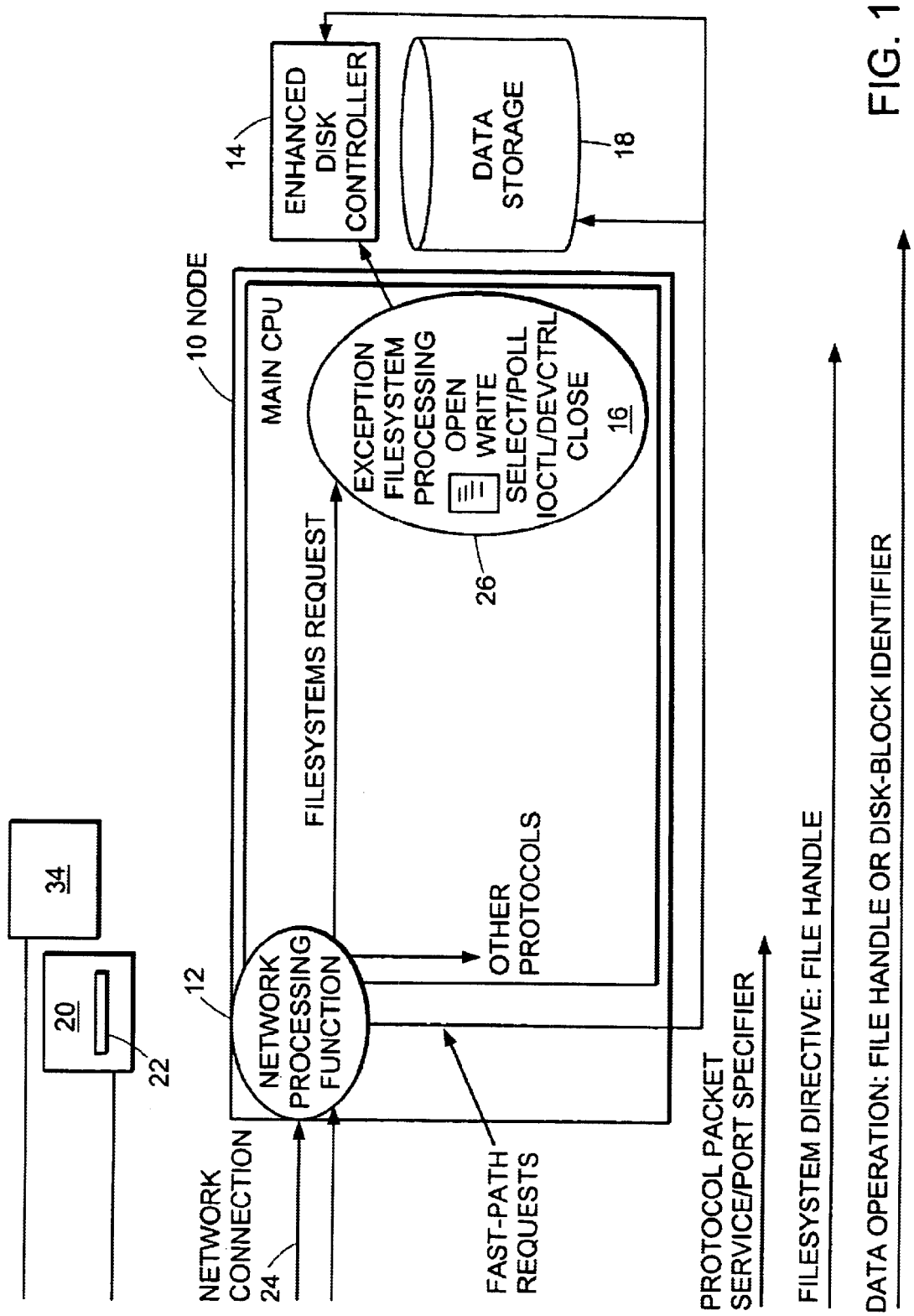
FIG. 1 is a block diagram of an accelerated filesystem in which READ operations are placed on a fast-path.

FIG. 1 illustrates an accelerated filesystem that is associated with a node 10 in a computer network. The filesystem includes a fast-path and a slow-path. The fast-path includes an enhanced network processing function 12 and an enhanced storage controller function 14. The slow-path includes an exception filesystem processing function 16. The network processing function 12 and the exception processing function 16 are associated with the node 10. The enhanced storage controller function 14 is associated with a storage controller that controls at least one data storage device 18. The network processing function, storage controller function and exception filesystem processing function can be independently implemented with network processors, dedicated hardware, software components running on general-purpose processors, or any combination thereof. The enhanced network processing function 12 is operative to recognize filesystem requests in network traffic and can determine whether to place incoming filesystem requests on the fast-path or the slow-path. The exception processing function 16 executes OPEN, WRITE, select/poll, ioctl/devctrl and CLOSE operations and can perform conventional READ operations. The enhanced storage controller function 14 facilitates READ operations and can also perform as a standard storage controller.

Figure 2:
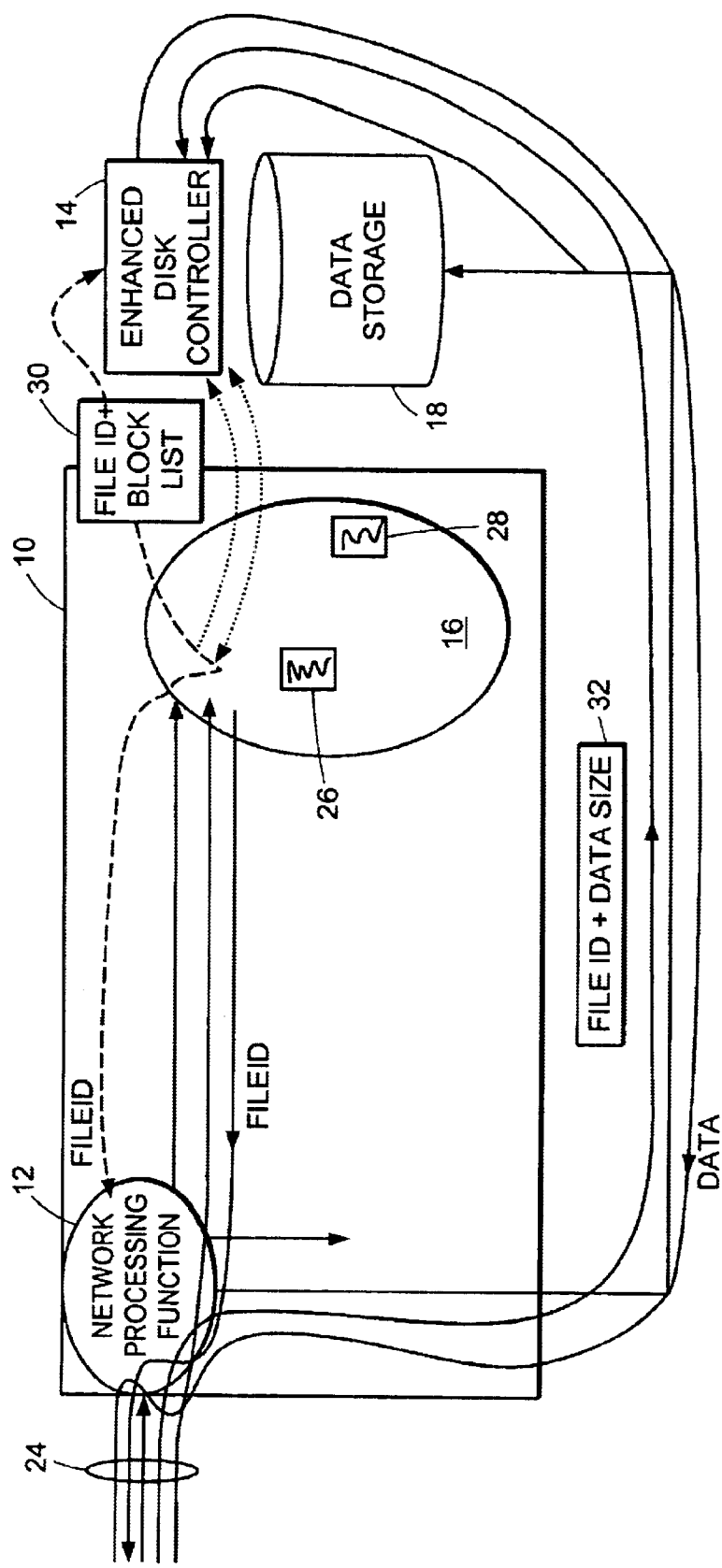
FIG. 2 is a block diagram of the filesystem of FIG. 1 that illustrates use of the fast-path.

Referring now to FIGS. 1 and 2, the filesystem is operative to facilitate data access operations between a requester 20 and the data storage device 18. Upon receipt of an initial data access request, the filesystem is operative to "open" the file in which the data is stored. The request may originate from an application 22 that is not executed on the node, but rather is executed on another network device and transmits the request to the node via a network connection 24. The request indicates a filename and a mode of data access, such as READ, WRITE or READ+WRITE. In response to the request, the filesystem determines whether the file exists on the storage device 18. The determination may be made by examining metadata 28 that is maintained by the exception filesystem processing function 16. The metadata indicates the physical location of specific data that corresponds with filenames, where the physical location may be, for example, a disk and sector associated with the data storage unit 18. A determination that the file does not exist may result in either failure or creation of a new file, in accordance with predetermined criteria. If the file is determined to exist, and the indicated request is associated with a READ operation, a session identifier (FileID) that corresponds to the requestor's current access to the file is generated and provided to the application 22 as a file handle via the enhanced network processing function 12 and the network connection 24, metainformation 28 is used to validate access rights. If access rights are available to the application 22, the FileID is provided to the enhanced network processing function. Further, the metadata 26, which describes the file and its location information, is obtained, tagged with the FileID, and copied into a memory cache associated with the enhanced storage controller function 14. The tagged metadata 26 includes file location information in the form of logical block addresses (block list) sufficient to satisfy the length of the, or a sequence of, intended I/O operation(s). The storage controller function 14 associates a data pointer with the file data as part of the file state. The file is then considered "open."

Once the file is open, subsequent data access operations associated with the READ session are facilitated by employing the FileID. The enhanced network processing function 12 redirects READ operations associated with an opened file whose session ID is recognized as being a "fast-path" access to the storage controller. The requests are recognized as file "read( )" operations that employ a file handle corresponding to a FileID that has been cached by the enhanced network processing function. For such READ operations, a FileID and a data size indicator 32 are provided to the storage controller function 14 by the network processing function 12. The FileID is employed by the storage controller function 14 to obtain the corresponding tagged block list 30 in the memory cache. The obtained metadata is employed to access the appropriate data from the storage device 18. In particular, the storage controller function 14 retrieves the requested length of file data indicated by the data size field in the indicator 32 and returns the data to the network processor function 12 to satisfy the request. The enhanced storage controller function 14 also updates the data pointer to indicate the location in the block list for the next sequential request. It should be noted that multiple concurrent READ operations may be processed on the fast-path in the manner described above.

Under some circumstances, it may be desirable to move traffic from the fast-path to the slow-path. For example, if a WRITE operation is attempted by another requestor 34, the filesystem prompts the enhanced network processing function 12 and the enhanced storage controller function 14 to update the filesystem's view of the read session status, and to delete the FileID from memory. Subsequent requests are then directed by the enhanced network processing function 12 to the exception filesystem processing function 16 associated with the slow-path to ensure that synchronization is maintained. Similarly, if the storage controller function 14 exhausts the block list associated with the FileID then the storage controller function deletes the tagged block list from memory, updates the filesystem's view of the read session status, and prompts the exception filesystem processing function 16 to delete the FileID at the network processing function cache. Subsequent read( ) operations are then processed by the exception filesystem processing 16. Alternatively, the exception filesystem processing function may provide additional block lists associated with the READ session to the storage controller function.

Figure 3:
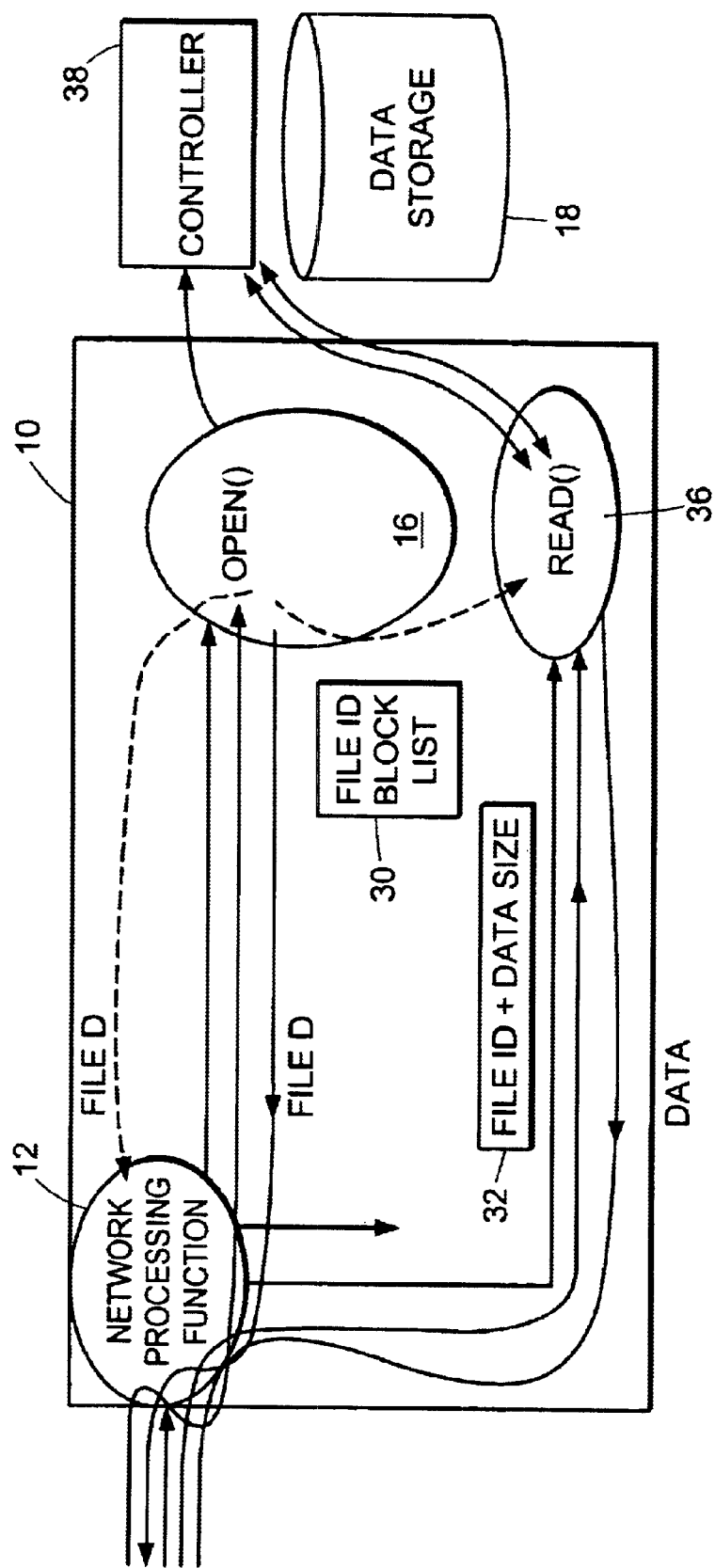
FIG. 3 is a block diagram of an alternative embodiment of the filesystem of FIG. 1.
Figure 4:
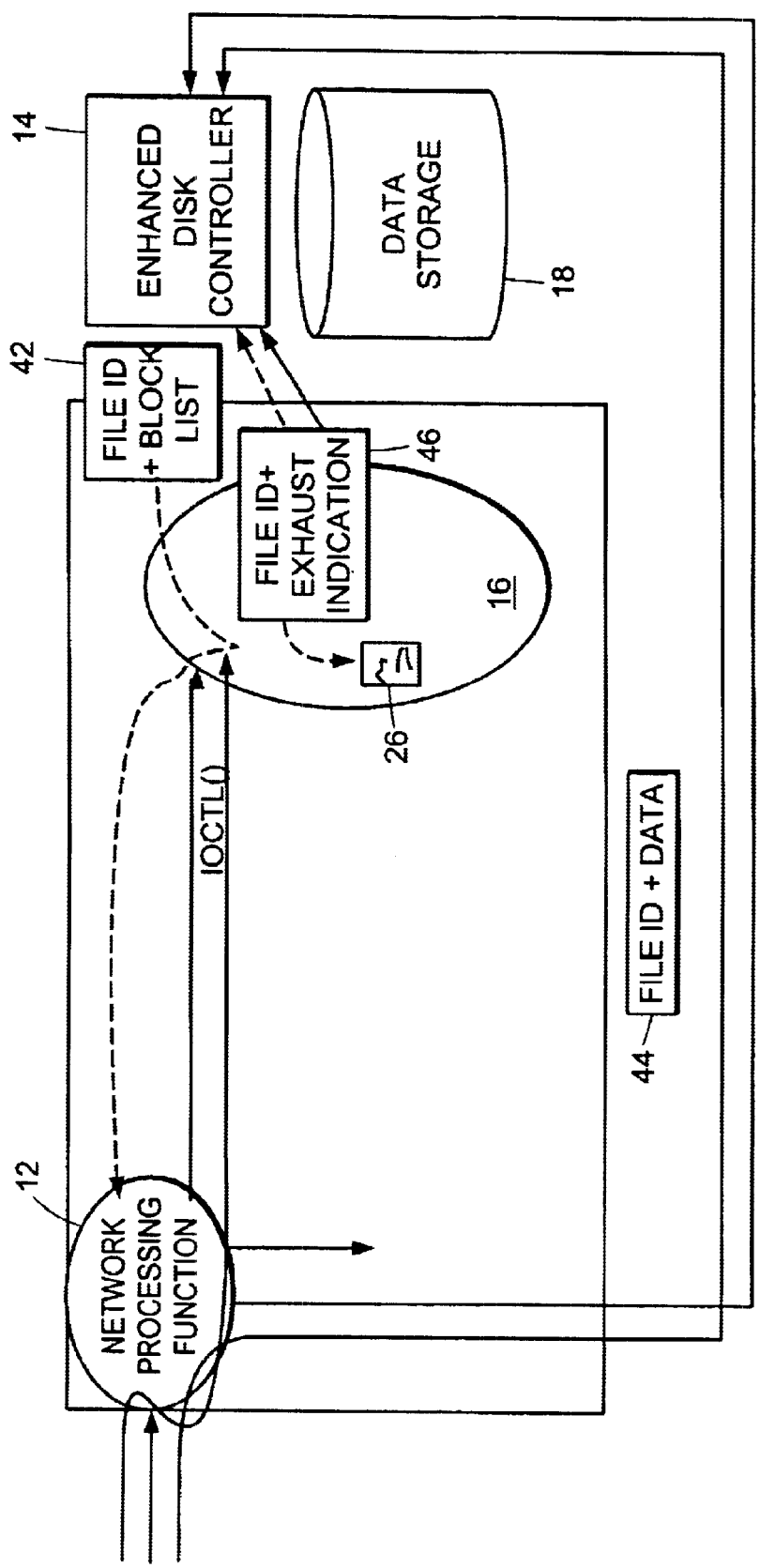
FIG. 4 is a block diagram of an accelerated filesystem in which WRITE operations are placed on the fast-path.

Referring to FIG. 3, in an alternative embodiment the tagged block list 30 for the open file is maintained by a software component 36 which may be included in the filesystem code but is accessed directly, thereby enhancing performance over a traditional filesystem implementation Referring now to FIG. 4, WRITE operations may also be placed on the fast-path when device activity can be constrained to a single writer 40 and no readers, from the perspective of storage unit 18. Blocks of memory in the data storage unit 18 are pre-allocated to enable unsupervised fast-path writes. A "write-reserve" command may be offered to allow the application 22 to indicate to the filesystem the number of blocks to pre-allocate. This enhancement can be used to tailor storage or retrieval to the needs of the application. The filesystem is free to ignore this indication and continue with a different preallocation policy. The list of preallocated blocks is tagged and the tagged list 42 provided to the controller 14, where it is stored in memory. The FileID is also provided to the application 22 as a file handle, and to the enhanced network processing function 12, where it is stored in memory. When a file handle corresponding to the FileID is recognized by the enhanced network processing function during subsequent WRITE operations associated with the session, command is directed to the enhanced storage controller. In particular, a FileID and data message 44 is provided to the storage controller 14. The FileID is employed by the enhanced storage controller to identify the list of preallocated blocks. A pointer may be employed to designate a position in the list. The data portion of the message 44 is written to the position in the list indicated by the pointer.

When the block list is exhausted, the enhanced storage controller notifies the exception filesystem processing function 16 by transmitting a FileID and exhaust indication message 46, which also serves to update the filesystem metadata as to the file's state. In response, the exception filesystem processing function 16 provides the FileID to the enhanced network processing function to prompt deletion of the FileID from network processing function 12 memory. Alternatively, the filesystem may preallocate another series of blocks. When the file is closed, the FileID is deleted at the enhanced network processing function memory and the enhanced storage controller memory, any extra blocks are released, and the metadata 26 is updated to indicate the correct file length.

Variations, modifications and different applications of the invention taught in the Detailed Description and Drawing will be apparent to those skilled in the art. Accordingly, it should be understood that other embodiments of the invention might be practiced without departing from the spirit and scope of the invention as defined by the appended claims.

What is claimed is:

1. A filesystem that regulates access between a network device and a data storage unit, comprising:
   a first communication path with processing circuitry operative in response to prompting by said network device to perform operations on a designated file stored on the data storage unit;
   a second communication path with processing circuitry operative to process specific READ transactions selected by the network device to obtain data associated with the designated file from the data storage unit; and
   a routing function that selectively directs transactions to said first path and said second path based upon predetermined criteria.

2. The filesystem of claim 1 wherein said first communication path includes metadata associated with the designated file, and said metadata is tagged with an identifier and provided to said data storage unit.

3. The filesystem of claim 2 wherein said identifier is further provided to said routing function.

4. The filesystem of claim 3 wherein said identifier is provided to said network device as a discriminator.

5. The filesystem of claim 4 wherein said routing function is operative in response to a READ transaction that is propagated by said network device and that includes a file handle to determine whether the file handle corresponds to an identifier provided by said first communication path.

6. The filesystem of claim 5 wherein said routing function is operative in response to a determination that the file handle does not correspond to an identifier provided by said first communication path to provide the READ transaction to the first communication path.

7. The filesystem of claim 6 wherein said routing function is operative in response to a determination that the file handle corresponds to an identifier provided by said first communication path to provide the identifier to the second communication path.

8. The filesystem of claim 7 wherein said second communication path includes a storage controller function operative in response to the identifier provided by the routing function to perform an identifier to block list translation.

9. The filesystem of claim 8 wherein said storage controller function employs said block list to prompt retrieval of at least some of the data associated with the designated file from the data storage unit.

10. The filesystem of claim 9 wherein the retrieved data is provided to the network device via said second communication path.

11. The filesystem of claim 10 wherein said routing function includes memory wherein said identifier is stored.

12. The filesystem of claim 11 wherein said storage controller function includes memory wherein said identifier is stored.

13. The filesystem of claim 12 wherein said identifier is removed from said routing function memory and said storage controller function memory if a WRITE transaction associated with the designated file is initiated by a second network device.

14. The filesystem of claim 12 wherein said identifier is removed from said routing function memory and said storage controller function memory if a transaction associated with the designated file other than a READ transaction is initiated by a second network device.

15. The filesystem of claim 12 wherein said identifier is removed from said routing function memory and said storage controller function memory if a transaction associated with the designated file is initiated by a second network device.

16. A method for facilitating delivery of data associated with a READ transaction between a data storage device and a network device, comprising the steps of:
   in response to prompting by said network device to open a designated file stored on the data storage unit,
      retrieving metadata associated with the designated file;
      associating an identifier with said metadata; and
      providing said identifier to the network device; and
      providing said identifier and a quantity of metadata to the storage device; and in response to a READ transaction,
   processing the READ transaction on a first path if the transaction does not include the identifier; and
   processing the READ transaction on a second path if the transaction includes the identifier.

17. The method of claim 16 including the further step of performing an identifier to block list translation on said second path by employing said metadata.

18. The method of claim 17 including the further step of employing said block list to prompt retrieval of at least some of the data associated with the designated file from the data storage unit.

19. The method of claim 18 including the further step of providing the retrieved data to the network device via the second path.

20. The method of claim 19 including the further step of processing the READ transaction on the first path if the transaction includes the identifier but a WRITE transaction associated with the designated file is initiated by a second network device while the designated file is open.

21. The method of claim 19 including the further step of processing the READ transaction on the first path if the transaction includes the identifier but a transaction associated with the designated file other than a READ transaction is initiated by a second network device.

22. The method of claim 16 including the further step of processing multiple concurrent READ transactions on the second path.

23. A filesystem that regulates access between a network device and a data storage unit, comprising:
   a first communication path with processing circuitry operative in response to prompting by said network device to open a designated file stored on the data storage unit and preallocate at least some free blocks associated with the data storage unit to said designated file;
   a second communication path with processing circuitry operative to process selected WRITE transactions initiated by the network device to store new data associated with the designated file in the preallocated blocks; and a routing function that selectively directs transactions to said first path and said second path based upon predetermined criteria.

24. The filesystem of claim 23 wherein said first communication path includes a list of said preallocated blocks associated with the designated file, and said list is tagged with an identifier and provided to said second communication path.

25. The filesystem of claim 24 wherein said identifier is further provided to said routing function.

26. The filesystem of claim 25 wherein said identifier is provided to said network device as a discriminator, and to the application as a file handle.

27. The filesystem of claim 26 wherein said routing function is operative in response to a WRITE transaction that is propagated by said network device and that includes data and a file handle to determine whether the file handle corresponds to the identifier provided by said first communication path.

28. The filesystem of claim 27 wherein said routing function is operative in response to a determination that the file handle does not correspond to the identifier provided by said first communication path to provide the WRITE transaction to the first communication path.

29. The filesystem of claim 28 wherein said routing function is operative in response to a determination that the file handle does correspond to the identifier provided by said first communication path to provide the identifier and the data to the enhanced storage controller.

30. The filesystem of claim 29 wherein said second communication path is operative in response to said identifier to retrieve the corresponding list of blocks, and to WRITE the data into at least some of said blocks.

31. The filesystem of claim 30 wherein if said list of blocks is exhausted the identifier is provided with an exhaust indication to said routing function to prompt further WRITE transactions that include the identifier to be processed on said first communication path.

32. The filesystem of claim 31 wherein if said list of blocks is exhausted another list of free blocks is preallocated and associated with said identifier.

33. A method for regulating access between a network device and a data storage unit, comprising the steps of:

in response to prompting by said network device,
opening a designated file stored on the data storage unit and preallocating a list of free blocks associated with the data storage unit to said designated file;
associating an identifier with the list of free blocks; and
providing the identifier to the network device; and in response to a WRITE transaction,
processing the WRITE transaction on a first path if the transaction does not include the identifier; and
processing the WRITE transaction on a second path if the transaction includes the identifier.

34. The method of claim 33 including the further step of employing said identifier on said second path to identify said list of free blocks.

35. The method of claim 34 including the further step of writing data associated with said WRITE transaction to at least some of said free blocks.

36. The method of claim 35 including the further step of processing additional WRITE transactions on the first path if the transactions include the identifier but the blocks in the list are exhausted.

37. The method of claim 35 including the further step of preallocating additional blocks if the blocks in the list are exhausted.

38. The method of claim 35 including the further step of processing the WRITE transaction on the first path if the transaction includes the identifier but a transaction associated with the designated file is initiated by a second network device.

* * * * *